March 21, 1939.    G. F. THOMAS ET AL    2,151,171
LUBRICATING APPARATUS
Filed July 1, 1936

Inventors
George F. Thomas
Joseph Bystricky
By Williams, Bradbury, McCaleb & Hinkle
Attys.

Patented Mar. 21, 1939

2,151,171

UNITED STATES PATENT OFFICE

2,151,171

LUBRICATING APPARATUS

George F. Thomas, Riverside, and Joseph Bystricky, Chicago, Ill., assignors to Stewart-Warner Corporation, a corporation of Virginia Application July 1, 1936, Serial No. 88,271

4 Claims. (Cl. 285—25)

Our invention relates generally to high pressure lubricating apparatus and more particularly to lubricant receiving fittings usable in such systems.

An appreciable part of the cost of installing lubricant receiving fittings upon automotive vehicles and other machinery resides in the cost of tapping holes in the bearing parts which are to receive the fittings. We have therefore devised an improved form of fitting and means for securing it in the oil hole of a bearing in which the operation of tapping the oil hole is obviated.

Briefly, we provide a tapped member which may be inserted in the untapped oil hole of a bearing, and provide a fitting which will expand such member to cause it tightly to grip the wall of the bearing oil hole and form a lubricant-tight seal.

It is thus an object of our invention to provide an improved lubricant receiving fitting which may be secured in the untapped oil hole of a bearing and which will be sufficiently tightly held therein to resist being driven out of the oil hole by the back pressure of the lubricant, and which will form a lubricant-tight seal against leakage of lubricant under high pressure.

A further object of our invention is to provide a fitting connection of the above described type in which the fitting may be secured in the untapped oil hole by means of a wrench, and which will not require that the fitting be forcibly pounded into the oil hole of a bearing.

Other objects will appear from the following description, reference being had to the accompanying drawing, in which Fig. 1 is a central vertical section of a fitting of our invention shown secured in the oil hole of a bearing;

In equipping automobiles and other machinery for the reception of lubricant receiving fittings of high pressure lubricating systems, one element of cost which, in large scale production, amounts to a considerable expense is the tapping of the oil holes of the bearing to receive threaded lubricant receiving fittings.

Several expedients have been proposed in the past to avoid the necessity of this tapping operation. A number of these proposals failed because of the inability to effect a sufficiently tight joint between the fitting and the bearings; others because the fitting, after it was secured in the bearing, could not readily be removed and replaced with another fitting; and others because the operation of securing the fitting to the bearing required the application of great pressure, which, in applying the fitting to relatively delicate bearing parts, resulted in setting up undesirable strains in the metal composing the bearing.

By means of our present invention, we have overcome these deficiencies of the prior art proposals and have provided a fitting which may easily be secured in the untapped oil hole of a bearing sufficiently tightly to prevent its expulsion therefrom by the lubricant pressure, which will form an effective seal preventing the escape of lubricant from the bearing, and in which the fitting part, which is subject to damage or breakage, may be readily removed and replaced should the occasion arise.

The fitting of our invention is composed of two inter-fitting parts, one adapted to be permanently secured in the bearing and the other part forming a means for thus securing the first part in the bearing, as well as a means for making a quick detachable connection with the coupler of a high pressure lubricant compressor.

Figure 1:
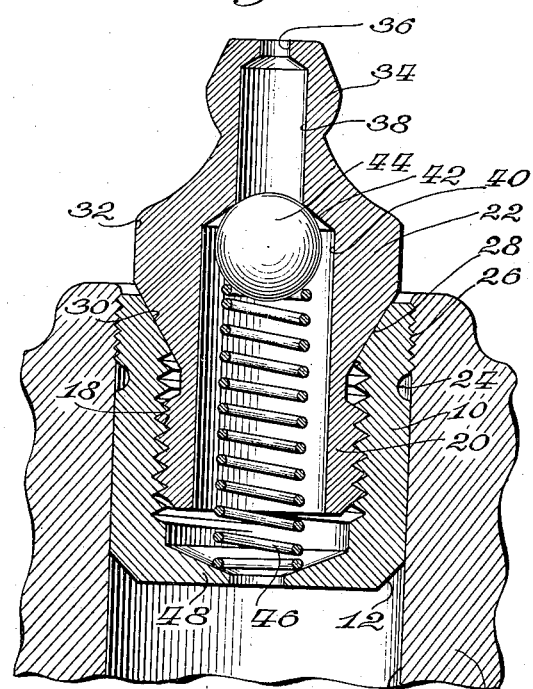
Figure 2:
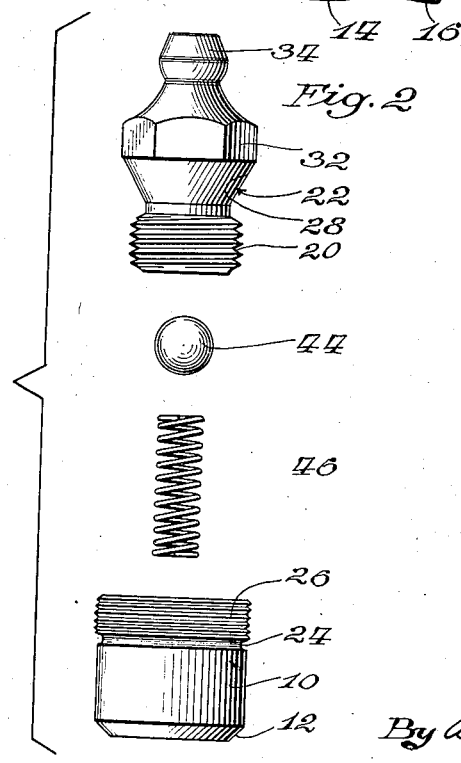
Fig. 2 is an exploded elevation of the composite parts of the fitting.

In Figs. 1 and 2, we have shown the first part as comprising a generally cup-shaped socket member 10, the inner end of which is beveled, as at 12, to facilitate insertion of the socket into the oil hole 14 of a bearing 16. The socket 10 is internally threaded as at 18 to receive the externally threaded shank 20 of a nipple 22. The shank has an external annular groove 24 formed therein, partially to weaken the wall of the socket a short distance from its outer end. The surface of the socket adjacent the groove 24 is provided with external ridges or threads 26. These may be in the form of a right-hand or a left-hand thread, or may be circumferential ridges and grooves. A left-hand thread is, however, the preferred construction.

The bore of the socket 10 has an outwardly tapering mouth 28 which is complemental to a frusto-conical shoulder 30 formed on the nipple 22. The nipple 22 has a hexagonal portion 32 for receiving a socket or other wrench, whereby the nipple may be screwed into the socket part. The nipple has a suitable head 34 for coupling engagement with the coupler of a high pressure lubricant compressor, the head having an inlet opening 36 communicating with an intermediate bore 38 and the latter communicating with an enlarged bore 40. The shoulder 42 formed between the bores 38 and 40 forms a seat for a ball check valve 44 held thereagainst by a compression coil spring 46, the lower end of which is seated upon the bottom of the socket, which may be considered as being formed by an inwardly annular flange 48.

In attaching the fitting to the bearing, the partially assembled fitting, with the nipple screwed into the socket only a short distance sufficient to hold the parts assembled, is inserted in the oil hole of a bearing so that the outer end of the socket is substantially flush with the outer surface of the bearing. The external diameter of the socket 10, and particularly of the ridges 26 formed thereon, will be substantially that of the diameter of the oil hole 14 so that as the socket is pushed into the oil hole, it will fit snugly therein. After the socket is in position, the nipple 22 is screwed into the socket until the frusto-conical surface 30 thereof engages with the complementally formed surface 28 of the socket or bushing. Thereafter, upon continued turning of the nipple in the bushing, the outer end portion of the socket (the portion beyond the annular groove 24) will be pressed radially outward due to the wedging action of the frusto-conical portion 30 of the nipple as the latter advances into the socket. This will cause the ridges or threads upon the outer end of the socket to be pressed into the wall of the oil hole of the bearing, deforming the latter and causing the formation of ridges or threads complemental to those on the socket. The socket will thus be mechanically interlocked with the bearing so that it will not be forced out of the oil hole under the extremely high pressures which may at times be used in the lubrication of the bearing, and so that the lubricant in the bearing will not leak past the ridges or threads 26. The complemental surfaces 30 of the nipple and 28 of the socket likewise form a seal which will be tight under very high lubricant pressures.

If the nipple part of the fitting should become damaged in any way, it may be readily removed from the bearing by unscrewing it with respect to the socket 10. Since the nipple 22 will, in the course of time, become rather tightly fixed in the socket 10, it is preferred that the ridges 26 on the socket be in the form of a left-hand thread, so that, as the attempt is made to unscrew the nipple from the socket 10, there will be a tendency to force the socket further into the oil hole, rather than to unscrew it therefrom.

When replacing a fitting or nipple as above described, it will not ordinarily be necessary to replace the ball valve 44 and spring 46, and the cost of replacement of damaged fittings will thus be considerably reduced. Furthermore, the fitting of our invention may be very economically manufactured since the assembling operation is relatively simple. Another advantage of the fitting of our invention is that a relatively long spring 46 may be used, thus decreasing the probability of the breakage of the spring upon sudden application of lubricant under pressure.

Figure 3:
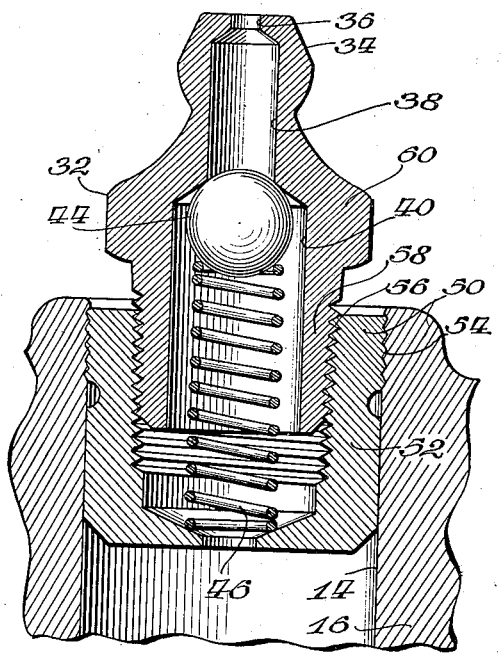
Fig. 3 is a view similar to Fig. 1 showing a modified form of our invention.
Figure 4:
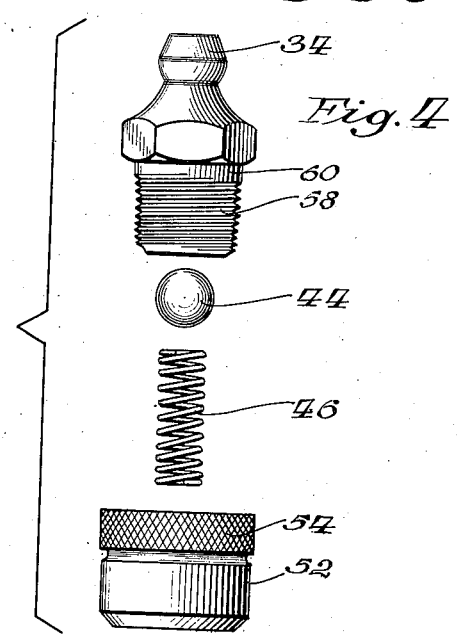
Fig. 4 is a view similar to Fig. 2 showing the composite parts of the modification of Fig. 3.

The modification of our invention shown in Figs. 3 and 4 is generally similar to that above described with reference to Figs. 1 and 2 except for the omission of the complemental frusto-conical surfaces for spreading the outer end portion of the socket, and we have therefore applied similar reference characters to the corresponding parts of the two forms of our invention and will describe in detail only the features by which the construction of Figs. 3 and 4 differs from that of Figs. 1 and 2.

The outer end portion 50 of the socket part 52 is provided with a diamond knurl 54, and the bore of the socket is provided with a tapering pipe thread 56. Similarly, the shank 58 of the nipple 60 has an external pipe thread so that as the nipple is screwed into the socket the outer portion 50 of the latter will be expanded radially outward so as to cause the projecting points of the diamond knurl 54 to press into the wall of the oil hole of the bearing and firmly embed themselves therein.

In both constructions, the inner portion of the socket part serves as a pilot to aid in properly centering and positioning the socket part during the operation of forcing the latter into the oil hole of a bearing, and in both constructions, screwing of the nipple into the socket causes radially outward expansion of the outer portion of the socket, with the result that external projections on the external surface of the outer portion of the socket part will dig into and firmly seat themselves in the bearing. In both constructions, the nipple part of the fitting may be readily unscrewed from the socket part for replacement, in the event of damage to the nipple part. Since the socket part is entirely enclosed in the oil hole of the bearing, it is not subject to breakage or damage except in such cases where the bearing itself is also broken or damaged, in which event, the bearing may be replaced. There will thus never be an occasion for replacing the socket part of the fitting and the latter will thus remain substantially as an integral part of the bearing.

While we have shown and described preferred embodiments of our invention, it will be readily understood by those skilled in the art that variations may be made in the construction disclosed without departing from the basic features of our invention. We therefore do not wish to be limited to the precise construction disclosed but wish to include within the scope of our invention all such modifications and variations which will readily suggest themselves:

What we claim as new and desire to secure by United States Letters Patent is:

1. A lubricant receiving fitting for attachment in an untapped oil hole of a bearing comprising a nipple and a socket part, said socket part being of external diameter snugly to fit in the oil hole of a bearing, and having projections on the external surface of its outer portion, said outer portion being connected with the remainder of the socket part by a weakened wall section, and said nipple and socket part having cooperating wedging surfaces, whereby, as said nipple is forced into said socket part, the said outer portion of said socket will be radially expanded to cause said projections to embed themselves in the wall of the oil hole of the bearing.

2. In a lubricant receiving fitting for high pressure lubricating systems, the combination of an internally threaded cup-shaped socket part of external diameter substantially that of the diameter of the oil hole into which the fitting is to be inserted, a nipple having a shank threaded in said socket and having a valve seat formed therein, and cooperating wedging means on said socket and said nipple whereby, as the latter is screwed into the former, a portion of the socket will be radially expanded into the bearing, a ball check valve in said nipple, and a spring compressed between said socket and said ball valve to hold the latter against said valve seat.

3. A lubricant receiving fitting for attachment in an untapped oil hole of a bearing comprising an externally threaded nipple, and a socket part having internal threads to receive said nipple, said socket part being of external diameter snugly to fit in the oil hole of a bearing, and having a thread formed on the external surface of its outer portion, said outer portion being connected with the remainder of the socket part by a weakened wall section, and said nipple and socket part having cooperating wedging surfaces, whereby, as said nipple is threaded into said socket part, the said outer portion of said socket will be radially expanded to cause said thread thereon to embed itself in the wall of the oil hole of the bearing.

4. In a lubricant receiving fitting for high pressure lubricating systems, the combination of an internally threaded cup-shaped socket part of external diameter substantially that of the diameter of the oil hole into which the fitting is to be inserted, the outer external portion of said socket having a left-hand thread formed thereon, a nipple having a shank threaded in said socket, and cooperating wedging means on said socket and said nipple whereby, as the latter is screwed into the former, said externally threaded portion of the socket will be radially expanded into the bearing, a ball check valve and seat in said nipple, and a spring compressed between said socket and said ball valve to hold the latter against its seat.

GEORGE F. THOMAS.
JOSEPH BYSTRICKY.